United States Patent
Suen et al.

(10) Patent No.: US 8,331,660 B2
(45) Date of Patent: Dec. 11, 2012

(54) ADAPTIVE COLOR-TEMPERATURE CALIBRATION SYSTEM AND METHOD

(75) Inventors: Wei-Ting Suen, Tainan (TW); Ling-Hsiu Huang, Tainan (TW)

(73) Assignee: Himax Media Solutions, Inc., Tainan County (TW)

( * ) Notice: Subject to any disclaimer, the term of this patent is extended or adjusted under 35 U.S.C. 154(b) by 489 days.

(21) Appl. No.: 12/761,288

(22) Filed: Apr. 15, 2010

(65) Prior Publication Data

US 2011/0254867 A1    Oct. 20, 2011

(51) Int. Cl.
 *G06K 9/00* (2006.01)
(52) U.S. Cl. ...... 382/162; 382/167; 382/274; 348/223.1
(58) Field of Classification Search .......... 382/162, 382/165, 166, 167, 274; 348/223.1, 231.7, 348/362, 453; 345/690, 589, 597, 605
See application file for complete search history.

(56) References Cited

U.S. PATENT DOCUMENTS

| | | | | |
|---|---|---|---|---|
| 2004/0231462 | A1* | 11/2004 | Shiraishi et al. | 75/348 |
| 2009/0231462 | A1* | 9/2009 | Kitajima | 348/223.1 |
| 2009/0303345 | A1* | 12/2009 | Deguchi et al. | 348/223.1 |

* cited by examiner

*Primary Examiner* — Ali Bayat
(74) *Attorney, Agent, or Firm* — Stout, Uxa, Buyan & Mullins, LLP

(57) ABSTRACT

An adaptive color-temperature calibration system and method are disclosed. A chrominance generation unit generates a chrominance criterion according to an input pixel. A matrix generation unit generates a calibration matrix according to the chrominance criterion and a basis matrix. A color calibration unit then performs color-temperature calibration on the input pixel according to the generated calibration matrix, thereby generating an output pixel.

12 Claims, 4 Drawing Sheets

ADAPTIVE COLOR-TEMPERATURE CALIBRATION SYSTEM AND METHOD

BACKGROUND OF THE INVENTION

1. Field of the Invention

The present invention generally relates to image display, and more particularly to an adaptive system and method for calibrating color temperature of pixels to be displayed.

2. Description of Related Art

Due to the imperfectness of liquid crystal display (LCD), the pixels prior to be displayed on the LCD are usually subjected to calibration to correct their color temperature.

The color-temperature calibration is conventionally performed by multiplying the red, green and blue values, i.e., (R, G, B), of the pixel by a basis matrix that is predetermined by assuming a white pixel, i.e., (255, 255, 255) in an 8-bit system. The conventional color-temperature calibration is simple in its algorithm, but, disadvantageously, generates color deviation when the pixel under calibration is substantially different from the white pixel.

For the reason that conventional algorithm could not effectively calibrate the color temperature of a display such as LCD, a need has arisen to propose a novel system and method for adaptively calibrating the color temperature of the pixels to be displayed.

SUMMARY OF THE INVENTION

In view of the foregoing, it is an object of the embodiment of the present invention to provide an adaptive color-temperature calibration system and an adaptive color-temperature calibration method such that the pixels to be displayed may be adaptively calibrated based on their respective chromaticity.

According to one embodiment, the adaptive color-temperature calibration system includes a chrominance generation unit, a matrix generation unit and a color calibration unit. The chrominance generation unit is configured to generate a chrominance criterion according to an input pixel, the chrominance criterion indicating amount of chrominance in the input pixel. The matrix generation unit is configured to generate a calibration matrix according to the chrominance criterion and a basis matrix. The color calibration unit is then configured to perform color-temperature calibration on the input pixel according to the generated calibration matrix, thereby generating an output pixel.

DETAILED DESCRIPTION OF THE INVENTION

Figure 1:
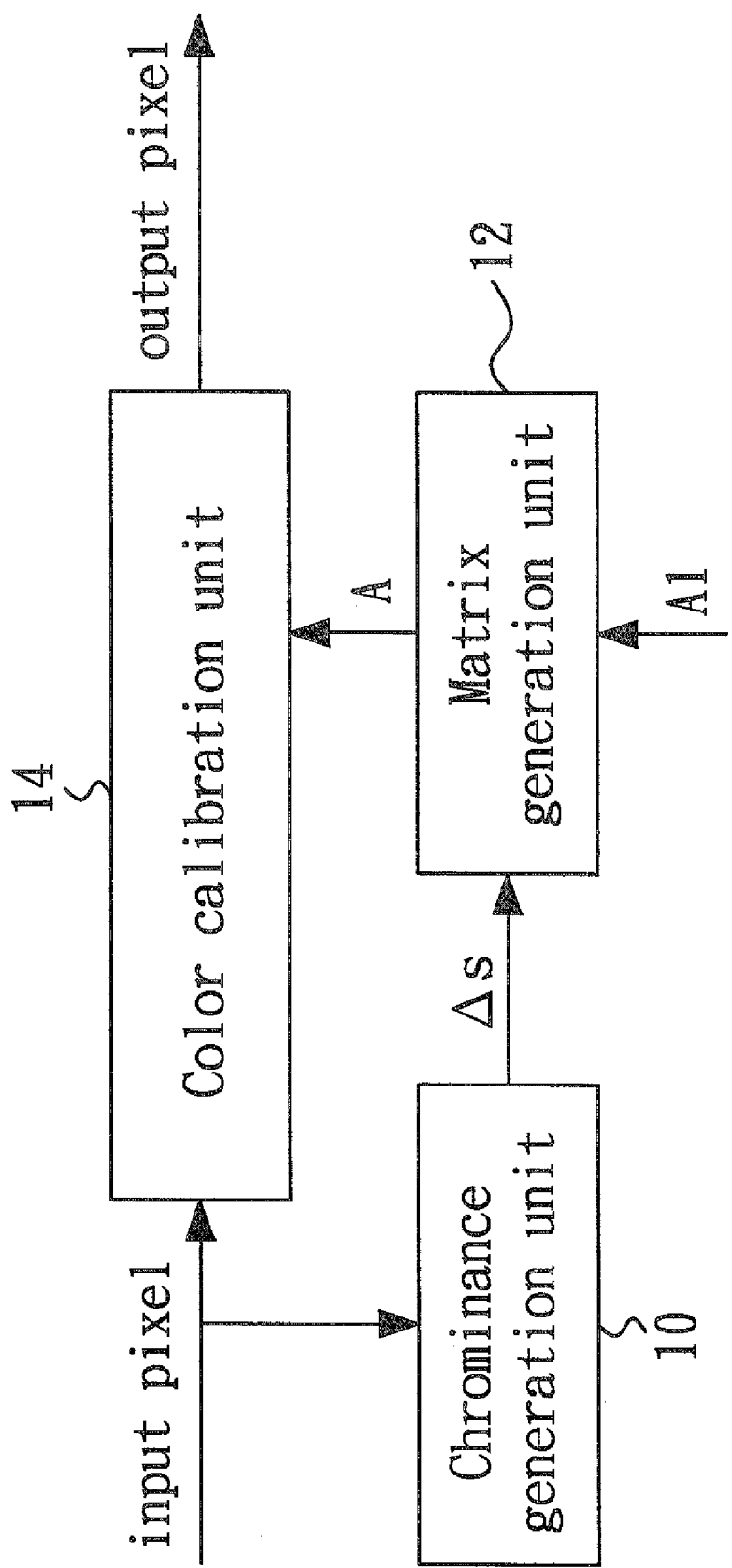
FIG. 1 shows a block diagram that illustrates an adaptive color-temperature calibration system according to one embodiment of the present invention.
Figure 2:
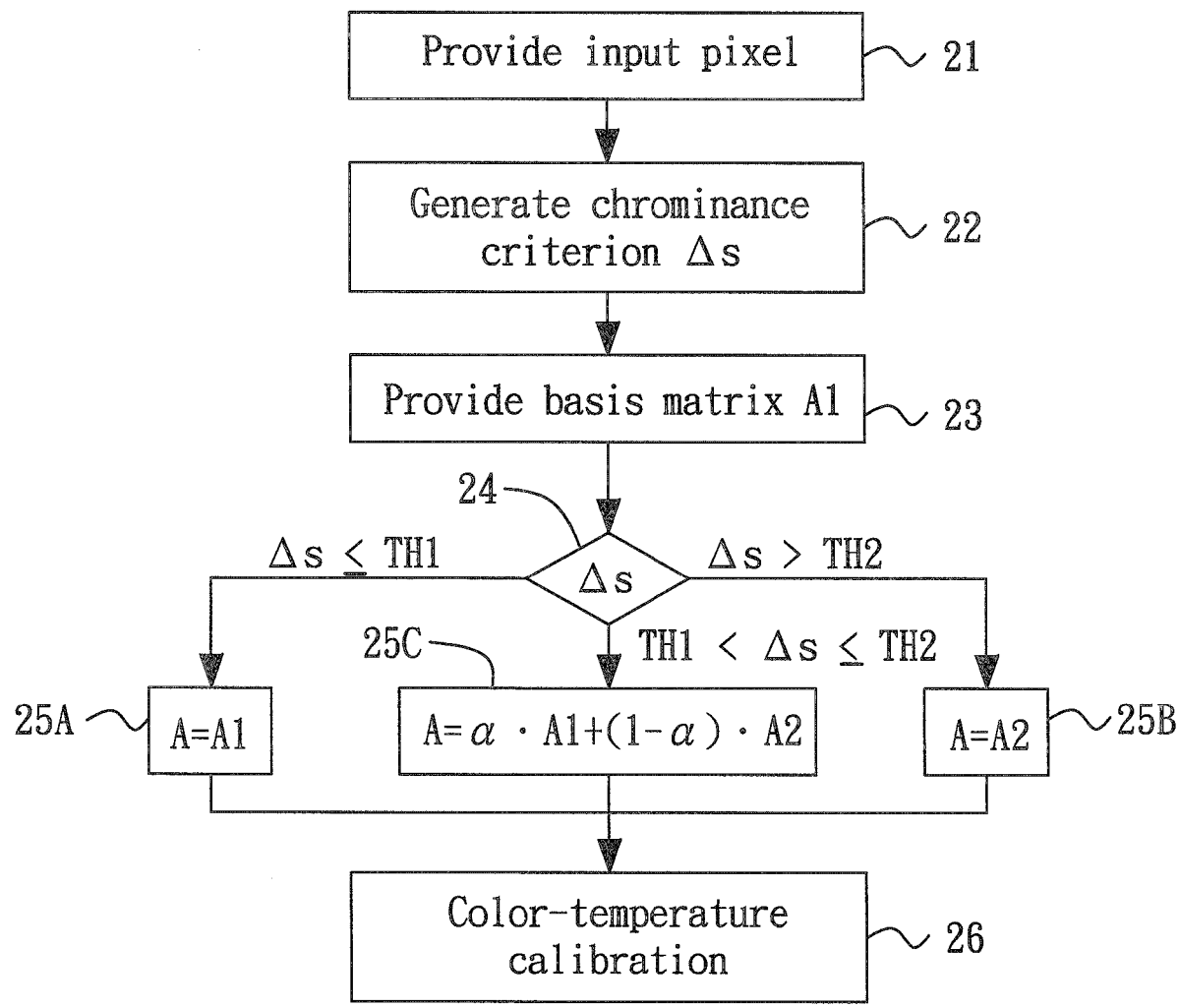
FIG. 2 shows a flow chart that illustrates an adaptive color-temperature calibration method according to one embodiment of the present invention.

FIG. 1 shows a block diagram that illustrates an adaptive color-temperature calibration system according to one embodiment of the present invention. FIG. 2 shows a flow chart that illustrates an adaptive color-temperature calibration method according to one embodiment of the present invention. It is noted that some steps in the flow are unnecessarily to be performed in sequence as indicated. Although RGB color space (or color model) is applied to calibrate a display such as a liquid crystal display (LCD) in the present embodiment, other color space, however, may be used instead, and an image system other than a display may also be calibrated according to the system and method disclosed in the embodiment.

Firstly, an input pixel represented by RGB components, i.e., (Rin, Gin, Bin) is provided in step 21. For pixel represented by a color space other than RGB, it may be transformed beforehand into the RGB format using a conventional transformation method. It is noted that the input pixel may be inputted one pixel at a time, or a block of input pixels may be inputted together.

Subsequently, a chrominance generation unit 10 generates a chrominance criterion Δs according to the input pixel (step 22). In the embodiment, the chrominance criterion Δs is used to indicate the amount of chrominance in the input pixel. A low value Δs, for example, indicates that the input pixel possesses little chrominance, and a high value Δs indicates that the input pixel possesses considerable chrominance. For example, a white input pixel, e.g., (255, 255, 255) in an 8-bit system, may have the chrominance criterion Δs approaching zero, while a red input pixel may have a substantially high value Δs. In a specific embodiment, the chrominance criterion Δs is defined as follows:

$$\Delta s = \frac{\max(RGB) - \min(RGB)}{\max(RGB)}$$

where max(RGB) is the maximum value of R, G and B, and min(RGB) is the minimum value of R, G and B.

In step 23, a basis matrix A1 is provided for calibrating color temperature of the display. In an exemplary embodiment, the basis matrix A1 is obtained beforehand by assuming that the input pixel is white, e.g., (255, 255, 255) in an 8-bit system. The basis matrix A1 may have a form exemplified, but not limited to, as follows:

$$A1 = \begin{bmatrix} a & 0 & 0 \\ 0 & b & 0 \\ 0 & 0 & c \end{bmatrix}$$

where a, b and c are constants.

Figure 3:
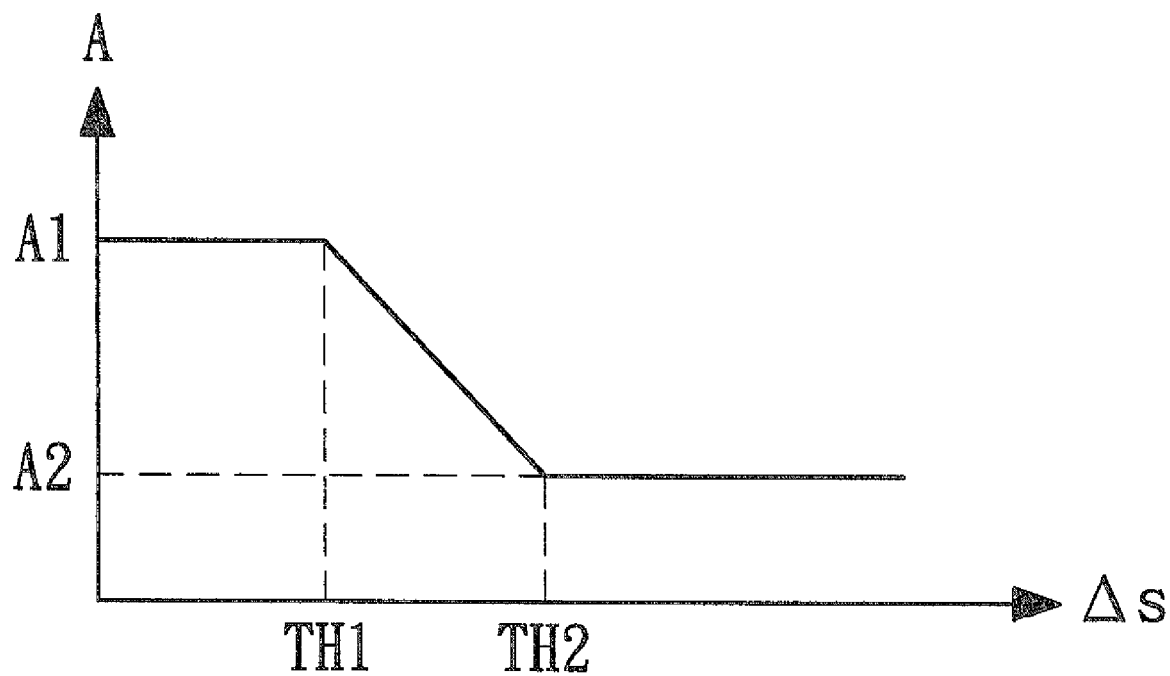
FIG. 3 shows a relationship between a determined calibration matrix and chrominance value.

Subsequently, a calibration matrix A is generated by a matrix generation unit 12 according to the chrominance criterion Δs and the basis matrix A1. Specifically, as shown in FIG. 3, for the first case, when the chrominance criterion Δs is lesser than or equal to a pre-determined first threshold TH1 (the left branch of step 24), the calibration matrix A is determined to be the basis matrix A1 (step 25A). For the second case, when the chrominance criterion Δ is greater than a pre-determined second threshold TH2 (the right branch of step 24), the calibration matrix A is determined to be a unit matrix (or identity matrix) A2 (step 25B), that is:

$$A2 = \begin{bmatrix} 1 & 0 & 0 \\ 0 & 1 & 0 \\ 0 & 0 & 1 \end{bmatrix}$$

For the third case, when the chrominance criterion Δs is between the first threshold TH1 and the second threshold TH2 (the middle branch of step 24), the calibration matrix A is determined by, for example, linearly interpolating the basis matrix A1 and the unit matrix A2 (step 25C). The calibration matrix A in this case may be expressed as follows:

$$A = \alpha \cdot A1 + (1-\alpha) \cdot A2$$

where α=(TH2−Δs)/(TH2−TH1)

The three cases discussed above may be expressed as follows:

$$\begin{cases} A = A1, \text{ if } \Delta s \leq TH1 \\ A = A2, \text{ if } \Delta s > TH2 \\ A = \alpha \cdot A1 + (1-\alpha) \cdot A2, \text{ if } TH1 < \Delta s \leq TH2, \text{ where } \alpha = \frac{(Th2 - \Delta s)}{TH2 - ThH1} \end{cases}$$

It is noted that the number of the thresholds may be lesser than two or greater than two. Moreover, the calibration matrix A in the third case, i.e., when the chrominance criterion Δs is between the first threshold TH1 and the second threshold TH2, may be determined by way other than the linearly interpolation. For example, the line segment between TH1 and TH2 as shown in FIG. 3 may be replaced by a curve or their combination.

Afterwards, in step 26, a color calibration unit 14 performs color-temperature calibration on the input pixel (Rin, Gin, Bin) according to the generated matrix A from the block 12, therefore generating an output pixel (Rout, Gout, Bout). The operation of the color calibration unit 14 may be performed by multiplying the input pixel by the generated matrix A according to matrix multiplication, that is, $$[Rout\ Gout\ Bout] = [Rin\ Gin\ Bin] \cdot A$$
$$= [Rin\ Gin\ Bin] \cdot \begin{bmatrix} a_{11} & a_{12} & a_{13} \\ a_{21} & a_{22} & a_{23} \\ a_{31} & a_{32} & a_{33} \end{bmatrix}$$

wherein $a_{11}$ through $a_{33}$ are constants.

Figure 4A:
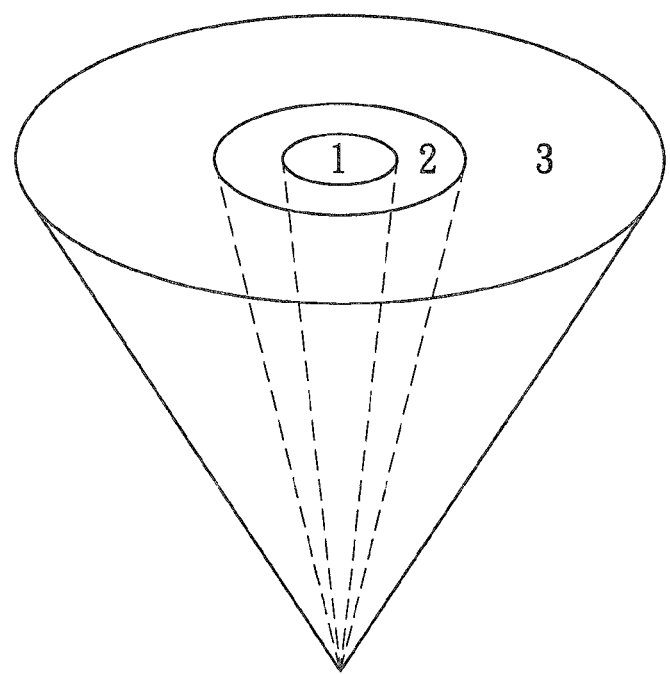
FIG. 4A shows a hue-saturation-lightness (HSL) color wheel, which is divided into three regions.
Figure 4B:
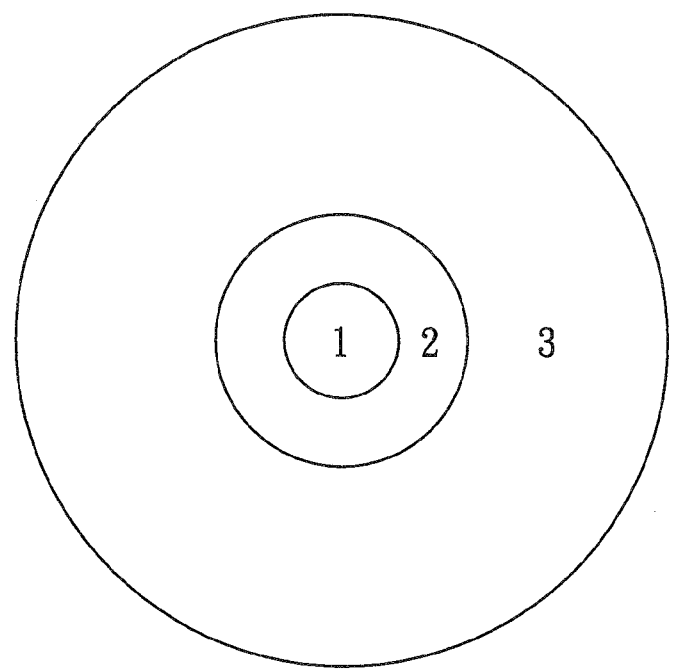
FIG. 4B shows a circular cross section of the color wheel in FIG. 4A.

The regions (i.e., less than TH1, between TH1 and TH2, and greater than TH2) corresponding to the three cases discussed above may be visualized in a hue-saturation-lightness (HSL) color wheel shown in FIG. 4A, in which the angle around the vertical axis represents to the hue, the distance from the vertical axis represents the saturation, and the distance along the axis represents the lightness. FIG. 4B shows a circular cross section of the color wheel. In FIG. 4A and FIG. 4B, the regions designated 1, 2 and 3 correspond respectively to the three regions discussed above, i.e., less than TH1, between TH1 and TH2, and greater than TH2.

According to the embodiment described above, when the chromaticity, i.e., the chrominance criterion, of the input pixel is substantially high, e.g., greater than the second threshold TH2, the input pixel is not changed (or equivalently speaking, the input pixel is multiplied by a unit matrix). On the other hand, when the chromaticity of the input pixel is substantially low, e.g., lesser than the first threshold TH1, the input pixel is then subjected to color-temperature calibration (e.g., the input pixel is multiplied by the basis matrix). In one embodiment, when the chromaticity of the input pixel is between the first threshold TH1 and the second threshold TH2 (that is, in a transient region), the input pixel is subjected to color-temperature calibration using a matrix that is linearly interpolated according to the basis matrix and the unit matrix, in order to make the transition smooth.

Although specific embodiments have been illustrated and described, it will be appreciated by those skilled in the art that various modifications may be made without departing from the scope of the present invention, which is intended to be limited solely by the appended claims.

What is claimed is:

1. An adaptive color-temperature calibration system, comprising:
a chrominance generation unit configured to generate a chrominance criterion according to an input pixel, the chrominance criterion indicating amount of chrominance in the input pixel;
a matrix generation unit configured to generate a calibration matrix according to the chrominance criterion and a basis matrix; and
a color calibration unit configured to perform color-temperature calibration on the input pixel according to the generated calibration matrix, thereby generating an output pixel;
wherein the input pixel is represented by red (R), green (G) and blue (B) in RGB color space, and the color calibration unit performs color-temperature calibration by multiplying the input pixel by the generated calibration matrix A according to matrix multiplication:

$$[Rout\ Gout\ Bout] = [Rin\ Gin\ Bin] \cdot A$$
$$= [Rin\ Gin\ Bin] \cdot \begin{bmatrix} a_{11} & a_{12} & a_{13} \\ a_{21} & a_{22} & a_{23} \\ a_{31} & a_{32} & a_{33} \end{bmatrix}$$

wherein [Rout Gout Bout] is the output pixel, [Rin Gin Bin] is the input pixel, and $a_{11}$ through $a_{33}$ are constants.

2. An adaptive color-temperature calibration system, comprising:
a chrominance generation unit configured to generate a chrominance criterion according to an input pixel, the chrominance criterion indicating amount of chrominance in the input pixel;
a matrix generation unit configured to generate a calibration matrix according to the chrominance criterion and a basis matrix; and
a color calibration unit configured to perform color-temperature calibration on the input pixel according to the generated calibration matrix, thereby generating an output pixel;
wherein the basis matrix Al has a form expressed as follows:

$$A1 = \begin{bmatrix} a & 0 & 0 \\ 0 & b & 0 \\ 0 & 0 & c \end{bmatrix}$$

where a, b and c are constants.

3. An adaptive color-temperature calibration system, comprising:
- a chrominance generation unit configured to generate a chrominance criterion according to an input pixel, the chrominance criterion indicating amount of chrominance in the input pixel;
- a matrix generation unit configured to generate a calibration matrix according to the chrominance criterion and a basis matrix; and
- a color calibration unit configured to perform color-temperature calibration on the input pixel according to the generated calibration matrix, thereby generating an output pixel;
- wherein the input pixel is represented by red (R), green (G) and blue (B) in RGB color space, and the chrominance criterion Δs is defined as follows:

$$\Delta s = \frac{\max(RGB) - \min(RGB)}{\max(RGB)}$$

wherein max(RGB) is a maximum value of R, G and B of the input pixel, and min(RGB) is a minimum value of R, G and B of the input pixel.

4. The system of claim 2, wherein the basis matrix is obtained by assuming that the input pixel is white.

5. An adaptive color-temperature calibration system, comprising:
- a chrominance generation unit configured to generate a chrominance criterion according to an input pixel, the chrominance criterion indicating amount of chrominance in the input pixel;
- a matrix generation unit configured to generate a calibration matrix according to the chrominance criterion and a basis matrix; and
- a color calibration unit configured to perform color-temperature calibration on the input pixel according to the generated calibration matrix, thereby generating an output pixel;
- wherein (1) the calibration matrix is generated to be the basis matrix when the chrominance criterion is lesser than or equal to a pre-determined first threshold; (2) the calibration matrix is generated to be a unit matrix when the chrominance criterion is greater than a pre-determined second threshold that is greater than the first threshold; (3) the calibration matrix is generated by linearly interpolating the basis matrix and the unit matrix when the chrominance criterion is between the first threshold and the second threshold.

6. The system of claim 5, wherein the calibration matrix A in the case (3) is expressed as follows:

$$A = \alpha \cdot A1 + (1-\alpha) \cdot A2$$

wherein A1 represents the basis matrix, A2 represents the unit matrix, TH1 is the first threshold, TH2 is the second threshold, Δs is the chrominance criterion, and α=(TH2−Δs)/(TH2−TH1).

7. An adaptive color-temperature calibration method, comprising:
- generating a chrominance criterion according to an input pixel, the chrominance criterion indicating amount of chrominance in the input pixel;
- generating a calibration matrix according to the chrominance criterion and a basis matrix; and
- performing color-temperature calibration on the input pixel according to the generated calibration matrix, thereby generating an output pixel;
- wherein the input pixel is represented by red (R), green (G) and blue (B) in RGB color space, and the step of color-temperature calibration comprises:
- multiplying the input pixel by the generated calibration matrix A according to matrix multiplication:

$$[Rout\ Gout\ Bout] = [Rin\ Gin\ Bin] \cdot A$$
$$= [Rin\ Gin\ Bin] \cdot \begin{bmatrix} a_{11} & a_{12} & a_{13} \\ a_{21} & a_{22} & a_{23} \\ a_{31} & a_{32} & a_{33} \end{bmatrix}$$

wherein [Rout Gout Bout] is the output pixel, [Rin Gin Bin] is the input pixel, and $a_{11}$ through $a_{33}$ are constants.

8. An adaptive color-temperature calibration method, comprising:
- generating a chrominance criterion according to an input pixel, the chrominance criterion indicating amount of chrominance in the input pixel;
- generating a calibration matrix according to the chrominance criterion and a basis matrix; and
- performing color-temperature calibration on the input pixel according to the generated calibration matrix, thereby generating an output pixel;
- wherein the input pixel is represented by red (R), green (G) and blue (B) in RGB color space, and the chrominance criterion Δs is defined as follows:

$$\Delta s = \frac{\max(RGB) - \min(RGB)}{\max(RGB)}$$

wherein max(RGB) is a maximum value of R, G and B of the input pixel, and min(RGB) is a minimum value of R, G and B of the input pixel.

9. An adaptive color-temperature calibration method, comprising:
- generating a chrominance criterion according to an input pixel, the chrominance criterion indicating amount of chrominance in the input pixel;
- generating a calibration matrix according to the chrominance criterion and a basis matrix; and
- performing color-temperature calibration on the input pixel according to the generated calibration matrix, thereby generating an output pixel;
- wherein the basis matrix A1 has a form expressed as follows:

$$A1 = \begin{bmatrix} a & 0 & 0 \\ 0 & b & 0 \\ 0 & 0 & c \end{bmatrix}$$

where a, b and c are constants.

10. The method of claim 9, further comprising a step of obtaining the basis matrix by assuming that the input pixel is white.

11. An adaptive color-temperature calibration method, comprising:
- generating a chrominance criterion according to an input pixel, the chrominance criterion indicating amount of chrominance in the input pixel;
- generating a calibration matrix according to the chrominance criterion and a basis matrix; and performing color-temperature calibration on the input pixel according to the generated calibration matrix, thereby generating an output pixel;

wherein (1) the calibration matrix is generated to be the basis matrix when the chrominance criterion is lesser than or equal to a pre-determined first threshold; (2) the calibration matrix is generated to be a unit matrix when the chrominance criterion is greater than a pre-determined second threshold that is greater than the first threshold; (3) the calibration matrix is generated by linearly interpolating the basis matrix and the unit matrix when the chrominance criterion is between the first threshold and the second threshold.

12. The method of claim 11, wherein the calibration matrix A in the case (3) is expressed as follows:

$$A=\alpha.A1+(1-\alpha).A2$$

wherein A1 represents the basis matrix, A2 represents the unit matrix, TH1 is the first threshold, TH2 is the second threshold, $\Delta s$ is the chrominance criterion, and $\alpha=(TH2-\Delta s)/(TH2-TH1)$.

* * * * *